US007031678B2

(12) United States Patent
Ballantyne

(10) Patent No.: US 7,031,678 B2
(45) Date of Patent: Apr. 18, 2006

(54) WIRELESS SPEECH AND DATA TRANSMISSION

(75) Inventor: Gary J. Ballantyne, Christchurch (NZ)

(73) Assignee: Qualcomm Inc., San Diego, CA (US)

( * ) Notice: Subject to any disclaimer, the term of this patent is extended or adjusted under 35 U.S.C. 154(b) by 275 days.

(21) Appl. No.: 10/620,896

(22) Filed: Jul. 15, 2003

(65) Prior Publication Data

US 2005/0014477 A1 Jan. 20, 2005

(51) Int. Cl.
*H04B 1/04* (2006.01)

(52) U.S. Cl. .............................. 455/127.4; 455/127.2; 455/552.1; 375/297; 370/493

(58) Field of Classification Search ............ 455/127.4, 455/103, 127.2, 127.3, 127.1, 552.1, 129; 375/297; 370/493; 379/265.09
See application file for complete search history.

(56) References Cited

U.S. PATENT DOCUMENTS 5,287,543 A * 2/1994 Wolkstein .................. 455/13.3
5,541,554 A * 7/1996 Stengel et al. ................ 330/51
5,805,636 A * 9/1998 Rao et al. ................... 375/222
5,872,481 A * 2/1999 Sevic et al. ................... 330/51
6,625,427 B1 * 9/2003 Kayano et al. ............. 455/103
6,778,842 B1 * 8/2004 Asada ..................... 455/552.1
6,782,244 B1 * 8/2004 Steel et al. .............. 455/127.1
6,799,020 B1 * 9/2004 Heidmann et al. .......... 455/103
2002/0072397 A1 6/2002 Asada ........................ 455/568

FOREIGN PATENT DOCUMENTS

EP 0692918 A2 1/1996

* cited by examiner

*Primary Examiner*—Edward F. Urban
*Assistant Examiner*—Adeel Haroon
(74) *Attorney, Agent, or Firm*—Philip R Wadsworth; Charles D Brown; George C Poppas

(57) ABSTRACT

This disclosure is directed to techniques for voice and data transmission from a wireless communication device, such as mobile telephone handset. In accordance with the disclosure, a wireless communication provides a hybrid coupler that permits voice and data calls to be combined for transmission over a common air interface. When increased transmit power is required, the wireless communication device prioritizes the voice call over the data call. In this case, the voice call is sent over both the voice output branch and the data output branch, taking advantage of the power amplifier in each output branch chain to achieve a greater overall transmit power for the voice transmission. In this manner, the mobile subscriber unit independently and simultaneously handles data and voice calls under ordinary circumstances, but drops the data call and combines the voice and data output branches for voice transmission when increased transmit power is required for the voice transmission.

68 Claims, 8 Drawing Sheets

WIRELESS SPEECH AND DATA TRANSMISSION

TECHNICAL FIELD

The disclosure relates to wireless communication and, more particularly, techniques for transmission of voice and data in a wireless communication system.

BACKGROUND

Emerging wireless communication standards, such as the CDMA2000 1xEV-DO standard, a third-generation (3G) wireless technology optimized for data, are capable of supporting simultaneous voice and data transmission at different carrier frequencies. For example, a user may send and receive both voice and data from a wireless communication device, such as a mobile telephone handset. To accommodate simultaneous voice and data transmission, some mobile wireless communication devices may be designed to incorporate dual transmitters, one for voice calls and one for data calls. However, dual transmitters add significant cost, complexity, and size to the wireless communication device, requiring duplication of substantial portions of the transmitter chain and air interface.

SUMMARY

This disclosure is directed to techniques for voice and data transmission from a wireless communication device, such as a mobile telephone handset. In accordance with the disclosure, a wireless communication device provides a hybrid coupler and control circuitry that permit voice and data calls processed over separate transmitter output branches to be combined for transmission over a common air interface.

When increased transmit power is required, the wireless communication device prioritizes the voice call over the data call. In this case, the voice call is sent over both the voice output branch and the data output branch, taking advantage of the power amplifier in each output branch to achieve a greater overall transmit power. Hence, the wireless communication device independently and simultaneously handles data and voice calls under ordinary circumstances, but drops the data call and combines the voice and data output branches for voice transmission when increased transmit power is required for the voice transmission.

In one embodiment, the disclosure provides a power amplifier module comprising a first amplifier to amplify a voice call for transmission over a first output branch, a second amplifier to amplify a data call for transmission over a second output branch, a phase shifter to generate a phase-shifted version of the voice call, and a switch to decouple the data call from the second amplifier and couple the phase-shifted version of the voice call to the second amplifier when required transmit power for the voice call exceeds the threshold.

In another embodiment, the disclosure provides a power amplifier module comprising a first amplifier to amplify a voice call for transmission over a first output branch, a second amplifier to amplify a data call for transmission over a second output branch, a coupler circuit to combine the first and second output branches for transmission over a wireless interface associated with a mobile wireless communication device, and means for coupling a phase-shifted version of the voice call to the second amplifier when required transmit power for the voice call exceeds a threshold.

In an added embodiment, the disclosure provides a power amplifier/antenna module comprising a first amplifier to amplify a voice call for transmission over a first output branch, a second amplifier to amplify a data call for transmission over a second output branch, a radio frequency antenna for a wireless interface associated with a mobile wireless communication device, and a coupler circuit to combine the first and second output branches for transmission over the antenna.

In a further embodiment, the disclosure provides a method comprising transmitting a voice call via a first output branch, transmitting a data call via a second output branch, combining the first and second output branches for transmission over a wireless interface associated with a mobile wireless communication device, and transmitting the voice call via both the first and second output branches when a required transmit power for the voice call exceeds a threshold.

In another embodiment, the disclosure provides a mobile wireless communication device comprising a first output branch for transmission of a voice call, and a second output branch for transmission of a data call; transmitting a data call via a second output branch. A coupler circuit combines the first and second output branches for transmission over a wireless interface associated with a mobile wireless communication device. A power control unit directs transmission of the voice call via both the first and second output branches when required transmit power for the voice call exceeds a threshold.

In an added embodiment, the disclosure provides a method comprising transmitting a voice call at a first transmit frequency via a first output branch, transmitting a data call at a second transmit frequency via a second output branch, controlling a transmit power of a voice call in response to power control data, and dropping the data call and transmitting the voice call via both the first and second output branches at the first transmit frequency when the transmit power of the voice call exceeds a threshold.

In another embodiment, the disclosure provides a power amplifier module comprising a first amplifier to amplify a voice call for transmission over a first output branch, a second amplifier to amplify a data call for transmission over a second output branch, a first hybrid coupler to pass the voice call to the first amplifier and generate a phase-shifted version of the voice call, a switch device to couple the phase-shifted version of the voice call to the second amplifier, and decouple the data call from the second amplifier when required transmit power for the voice call exceeds a threshold, and a second hybrid coupler to combine the first and second output branches for transmission over a wireless interface associated with a mobile wireless communication device.

In a further embodiment, the disclosure provides a mobile wireless communication device comprising a first output branch for transmission of a voice call at a first transmit frequency, and a second output branch for transmission of a data call at a second transmit frequency. A power control unit controls a transmit power of a voice call in response to power control data. The power control unit drops the data call and directs transmission of the voice call via both the first and second output branches at the first transmit frequency when the transmit power of the voice call exceeds a threshold.

The voice calls sent over the first and second output branches may occupy the same frequency range, but be phase-shifted relative to one another. A phase shifter may be provided to phase-shift the voice call sent over the second output branch by approximately 90 degrees. A 90-degree hybrid coupler circuit additively combines the voice call and the phase-shift voice call transmitted over the first and-second output branches, respectively, to produce a voice call with greatly increased transmit power for more reliable voice communication.

The details of one or more embodiments are set forth in the accompanying drawings and the description below. Other features, objects, and advantages will be apparent from the description and drawings, and from the claims.

DETAILED DESCRIPTION

Figure 1:
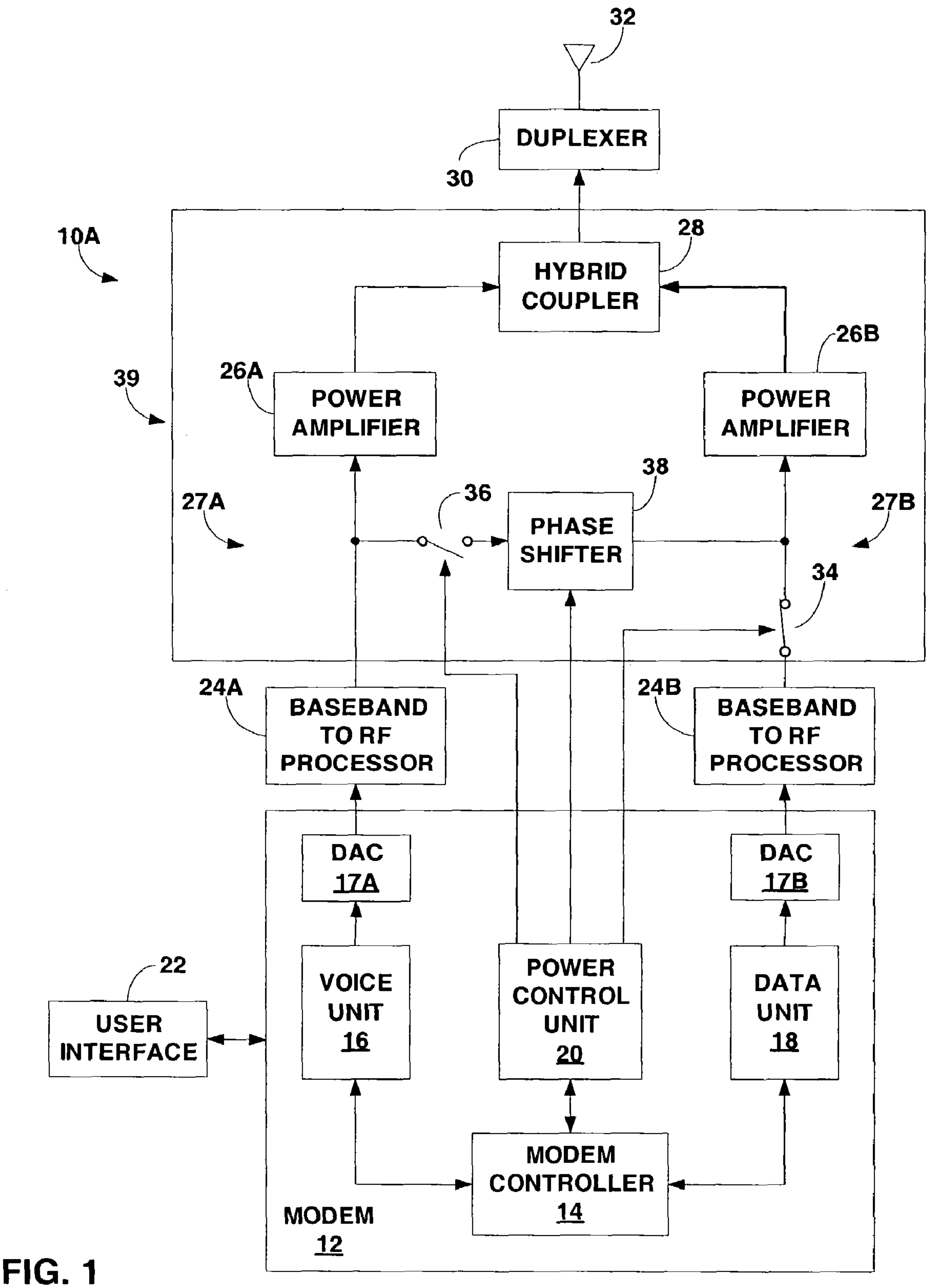
FIG. 1 is a block diagram illustrating a wireless communication device capable of combining dual transmitter output branches for high power voice transmission.

FIG. 1 is a block diagram illustrating a mobile wireless communication device 10A. Device 10A may take the form of a mobile telephone, a satellite telephone, a wireless PDA, a wireless networking card, or any other mobile device with wireless communication capabilities. In general, device 10A is configured to support both voice and data communication and, more particularly, simultaneous voice and data communication. In, this manner, a user of device 10A may carry on a voice conversation while accessing data services. Although illustrated for exemplary purposes in the context of a mobile wireless communication device, the techniques may be applied to any wireless communication devices that supports both voice and data communication.

For example, voice and data communication may be accomplished at different carrier frequencies. Device 10A may operate according to one or more of a variety of radio access technologies such as GSM, CDMA 2000, CDMA 2000 1x, CDMA 2000 1xEV-DO, WCDMA, or CDMA 1xEV-DV, provided such technologies support both voice and data communication. In some embodiments, voice and data communication may be accomplished via a combination of two or more radio access technologies, e.g., one radio access technology providing voice transmission and a different radio access technology providing data transmission.

As will be described, device 10A is capable of combining dual transmitter output branches for high power voice transmission, over a wireless interface associated the device, on a dynamic basis in response to increased power requirements for reliable voice communication. As shown in FIG. 1, device 10A includes a modem 12 having a modem controller 14, a voice transmit (TX) unit 16, a data transmit (TX) unit 18, digital-to-analog converters (DACs) 17A, 17B, and a power control unit 20. As will be described, power control unit 20 provides power control circuitry to selectively transmit a voice call over both output branches for increased transmit power and improved reliability of communication.

Device 10A also includes a user interface 22, which may incorporate a keypad, touchscreen, joystick, or other input media, as well as a display for presentation of information relating to a voice or data call. In addition, device 10A of FIG. 1 includes a baseband-to-RF processor 24A, baseband-to-RF processor 24B, power amplifier 26A, and power amplifier 26B.

Modem 12, as well as its constituent operating units, may take the form of a microprocessor, digital signal processor (DSP), ASIC, FPGA, or other logic circuitry programmed or otherwise configured to operate as described herein. Accordingly, modem controller 14 and operating units 16, 18, 20 may take the form of any of a variety of functional components implemented in hardware, software, firmware, or the like, as well as programmable features executed by a common processor or discrete hardware units.

Baseband-to-RF processors 24A, 24B and power amplifiers 26A, 26B form first and second output branches 27A, 27B for voice transmission and data transmission, respectively. Baseband-to-RF processors 24A, 24B convert the baseband signals generated by modem 12 to RF signals. Power amplifiers 26A, 26B amplify the RF signals for transmission over the air interface. Hybrid coupler 28 includes a coupler circuit that combines the amplified signals from first and second output branches 27A, 27B, and sends the combined signal over a common wireless interface via duplexer 30 and radio frequency antenna 32.

The voice and data signals are transmitted at different carrier frequencies to permit simultaneous transmission of voice and data calls by device 10A. The term "call" generally refers to any wireless communication session involving transfer of voice or data, either one-way or two-way, between device 10 and another device within a wireless communication network. The signals may be transmitted at different carrier frequencies prescribed by a common radio access technology, or as prescribed by separated radio access technologies supported by device. As one example, voice and data could be supported by CDMA 1x EV-DO.

As described herein, device 10A is configured to prioritize voice calls over data calls when increased transmit power is required. Whereas an interruption in a voice call due to insufficient transmit power is catastrophic, data calls are often more tolerant to delay and interruption. CDMA transmitters, for example, tend to have a roughly lognormal transmit output power probability, and only rarely transmit at maximum power. Accordingly, a pair of output branches can independently and simultaneously handle data and voice calls most of the time, but drop the data call and combine the branch outputs when increased power is required for the voice call.

Power control unit 20 may determine that increased transmit power is required for voice communication based on receipt of power control data, such as power up/down bits, from a base station via a control channel in the forward link. Power control unit 20 adjusts transmit power in response to the power control bits. When the transmit power exceeds a threshold, however, power control unit 20 drops the data call in order to obtain increased transmit power for the voice call. The threshold may be a predefined threshold, or a programmable threshold configurable via user interface 22.

For simultaneous voice and, data communication, device 10A transmits voice and data calls at different frequencies over different output branches 27A, 27B, and combines the output branches for transmission over a common air interface. When increased transmit power is required, however, the device 10A prioritizes the voice call over the data call. In this case, device 10A sends the voice call over both output branches, taking advantage of power amplifiers 26A, 26B in each output branch 27A, 27B to achieve a greater overall transmit power for more reliable voice communication. When required transmit power is decreased below the threshold, e.g., upon dissipation of fading effects, power control unit 20 may direct recommencement of the data call over output branch 27B.

In this manner, device 10A independently and simultaneously handles data and voice calls under ordinary circumstances, using separate output branches 27A, 27B, but drops the data call and combines the voice and data output branches for voice transmission when increased transmit power is required for the voice transmission. Power control, unit 20 is responsible for dropping the data call in response to power requirements. In particular, power control unit 20 controls switches 34, 36 and phase shifter 38. A digital implementation of power control unit 20 may be realized, e.g., as a programmable feature of modem 12. Alternatively, power control unit 20 may be a separate hardware component provided independently of modem 12.

In addition, in some embodiments, amplifiers 26A, 26B, hybrid coupler 28, switches 34, 36, and phase shifter 38 may be combined to form a power amplifier module 29. In particular, power amplifier module 29 may take the form of an integrated circuit module or a collection of integrated circuit modules that function to deliver the functionality described herein with respect to amplifiers 26A, 26B, hybrid coupler 28, switches 34, 36, and phase shifter 38 may be combined to form a power amplifier module 29.

In other embodiments, a combined power amplifier/antenna module may be provided, on an integrated circuit module or collection of integrated circuit modules. In this case, the power amplifier/antenna module may include amplifiers 26A, 26B, hybrid coupler 28, switches 34, 36, and phase shifter 38, as well as antenna 32 and duplexer 30. Power control unit 20 may be realized as a separate integrated circuit module, integrated with modem 12, or further integrated within power amplifier module 29. Also, in some embodiments, a power amplifier module 29 may be combined with duplexer 30 and antenna 32 to form a combined power amplifier/antenna module.

As shown in FIG. 1, switch 34 serves to switch out the data signal from second output branch, 27B. Power control unit 20 controls switch 34 to switch out the data signal in response to, a demand for increased transmit power in excess of a predetermined threshold. In some embodiments, power control unit 20 also may be configured to disable data TX unit 18, baseband-to-RF processor 24B, or both, when the required transmit power exceeds the threshold. Switch 36 switches in the voice signal from first output branch 27A for transmission via second output branch 27B. In particular, power control unit 20 switches in the voice signal in response to a demand for increased transmit power in excess of a predetermined threshold.

To support the combining of both output branches 27A, 27B, device 10 includes phase shifter 38 and hybrid coupler 28. The phase shifter produces a phase-shifted version of the voice call for transmission over the output branch 27B ordinarily used for data calls. Thus, device 10 transmits the voice signal over one output branch 27A, and a phase-shifted voice signal over the other output branch 27B, each at substantially the same frequency.

The phase-shifted voice signal does not pass through baseband-to-RF processor 24B. Instead, in the example of FIG. 1, each of the voice signals is initially processed by the same baseband-to-RF processor 24A, but then amplified by separate power amplifiers 26A, 26B. Accordingly, the voice signal and the phase-shifted voice signal occupy substantially the same carrier frequency range.

Phase, shifter 38 shifts the phase of the switched portion of the voice signal before application to second output branch 27B. For example, the phase shift applied to the voice signal that is switched into output branch 27B may be approximately 90 degrees. As phase shifter 38 is provided to match the characteristics of hybrid coupler 28. In particular, hybrid coupler 28 is preferably a 90-degree hybrid coupler circuit. Accordingly, phase shifter 38 introduces a phase shift of approximately 90 degrees.

When voice and data signals are transmitted via output branches 27A, 27B, they occupy different carrier frequency ranges. When the voice signal is transmitted via both output branches 27A, 27B, however, they occupy substantially the same carrier frequency range. Phase shifter 38 introduces a phase shift into the portion of the voice signal propagated along second output branch 27B. As a result, hybrid coupler 28 is able to additively combine the two voices signals transmitted over output branches 27A, 27B to produce a combined voice signal of substantially increased transmit power.

In other words, the voice calls sent over the first and second output branches occupy the same frequency range, but are phase-shifted relative to one another. In this manner, hybrid coupler 28 produces a voice signal with an increased overall transmit power for more reliable voice communication. Consequently, by prioritizing voice calls over data calls when necessary, device 10A may eliminate the need for dual transmitter chains for voice and data. Instead, simultaneous voice and data communication can be accomplished under ordinary circumstances by combining output branches 27A, 27B via hybrid coupler 28.

Figure 2:
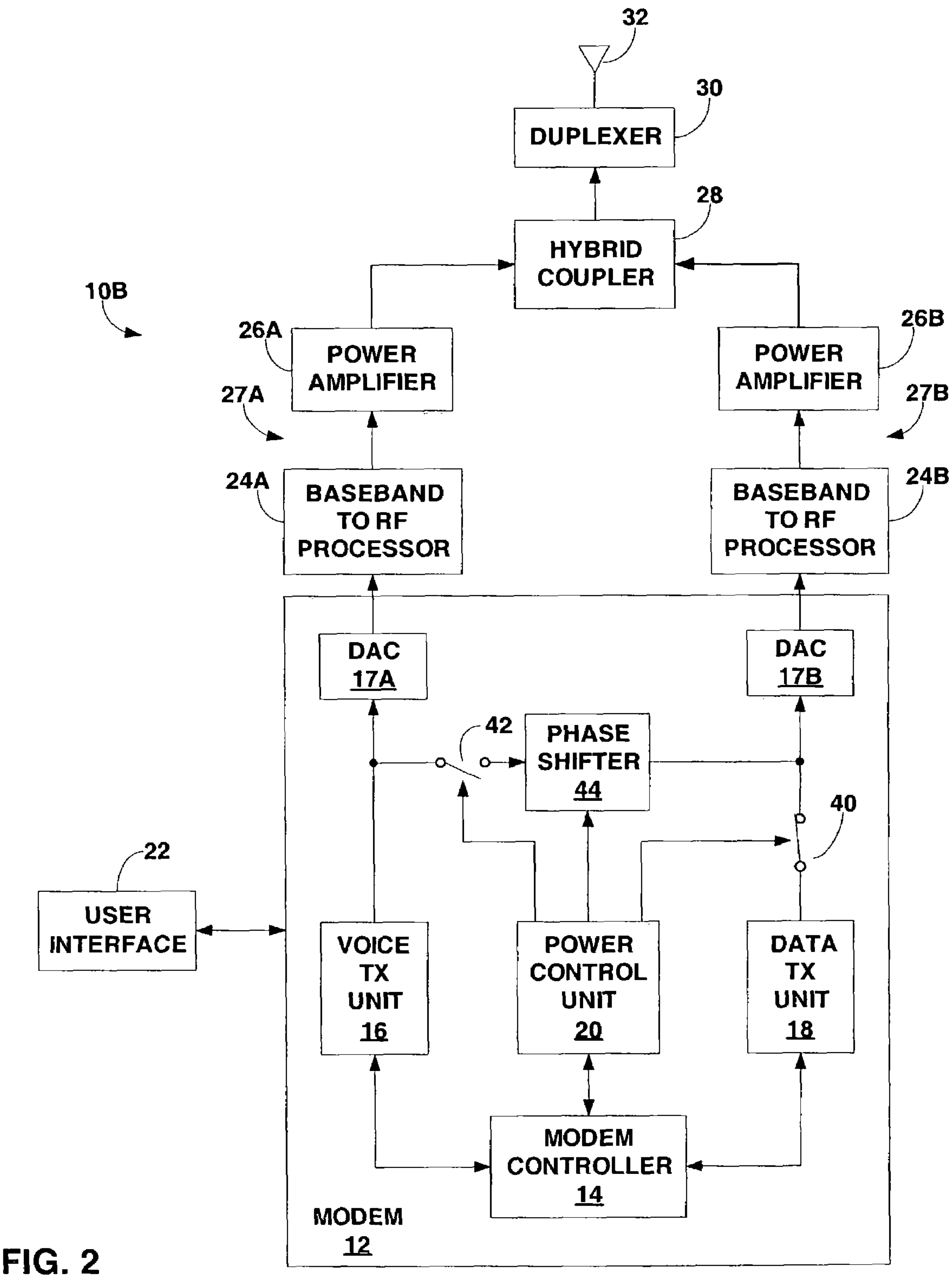
FIG. 2 is a block diagram illustrating an alternative wireless communication device capable of combining dual transmitter output branches for high power voice transmission.

FIG. 2 is a block diagram illustrating an alternative wireless communication device 10B capable of combining dual transmitter output branches for high power voice transmission. Device 10B conforms substantially to device 10A of FIG. 1, but represents an exemplary digital implementation in which switches 40 and 42, and a phase shifter 44, are provided within modem 12. In the example of FIG. 2, power control unit 20 switches out the digital data signal produced by data TX unit 18 via switch 40, and switches in the digital voice signal produced by voice TX unit 16 for application to phase shifter 44. Switches 40, 42 and phase shifter may be implemented in hardware, software, firmware, or both. Power control unit 20, switches 40, 42 and phase shifter 44 may form a digital signal processing unit for selectively coupling the voice call and phase-shifted voice call to the output branches. The digital signal processing unit may be realized as an integrated circuit module, either independently or as part of modem 12, as shown in FIG. 2.

Phase shifter 44 then phase shifts the digital values of the voice signal and applies the phase-shifted voice signal to output branch 27B. As in the example of FIG. 1, the phase-shifted voice signal may be shifted by approximately 90 degrees. In this manner, the digital voice, signal produced by voice TX unit 16 and the phase-shifted digital voice signal produced by phase shifter 44 are applied to DACs 17A, 17B and output branches 27A, 27B, respectively. In some embodiments, power control unit 20 may disable or stall data TX unit 18 during transmission of the phase-shifted voice signal via output branch 27B.

As in the example of FIG. 1, device 10B of FIG. 2 transmits the analog voice signal produced by DAC 17A over output branch 27A for processing by baseband-to-RF processor 24A and amplification by power amplifier 26A. The analog voice signal digitally encodes the voice information. In contrast to the example of FIG. 1, however, modem 12 produces the phase-shifted analog voice signal. In particular, when power control unit 20 opens switch 40, closes switch 42, and activates phase shifter 44, DAC 17B outputs the phase-shifted analog voice signal for processing by baseband-to-RF processor 24B. For this reason, baseband-to-RF processor 24B should be dynamically adjustable to handle conversion of the data signal to a first RF carrier range appropriate for data communication, as well as conversion of the phase-shifted voice signal to a second RF carrier range appropriate for voice communication.

Power control unit 20 may transmit a control signal (not shown) to baseband-to-RF processor 24B, or an oscillator associated with the baseband-to-RF processor 24B, to selectively modify the frequency response for processing of the phase-shifted voice signal. Baseband-to-RF processor 24A then converts the phase-shifted analog voice signal to the appropriate RF carrier frequency range. Power amplifier 26B then amplifies the phase-shifted RF voice signal, and transmits the signal to hybrid coupler 28, which may be a 90-degree hybrid coupler. Hence, in the example of FIG. 2, the voice signal and the phase-shifted voice signal produced by modem 12 are processed by different baseband-to-RF processors 24A, 24B within device 10B.

Figure 3:
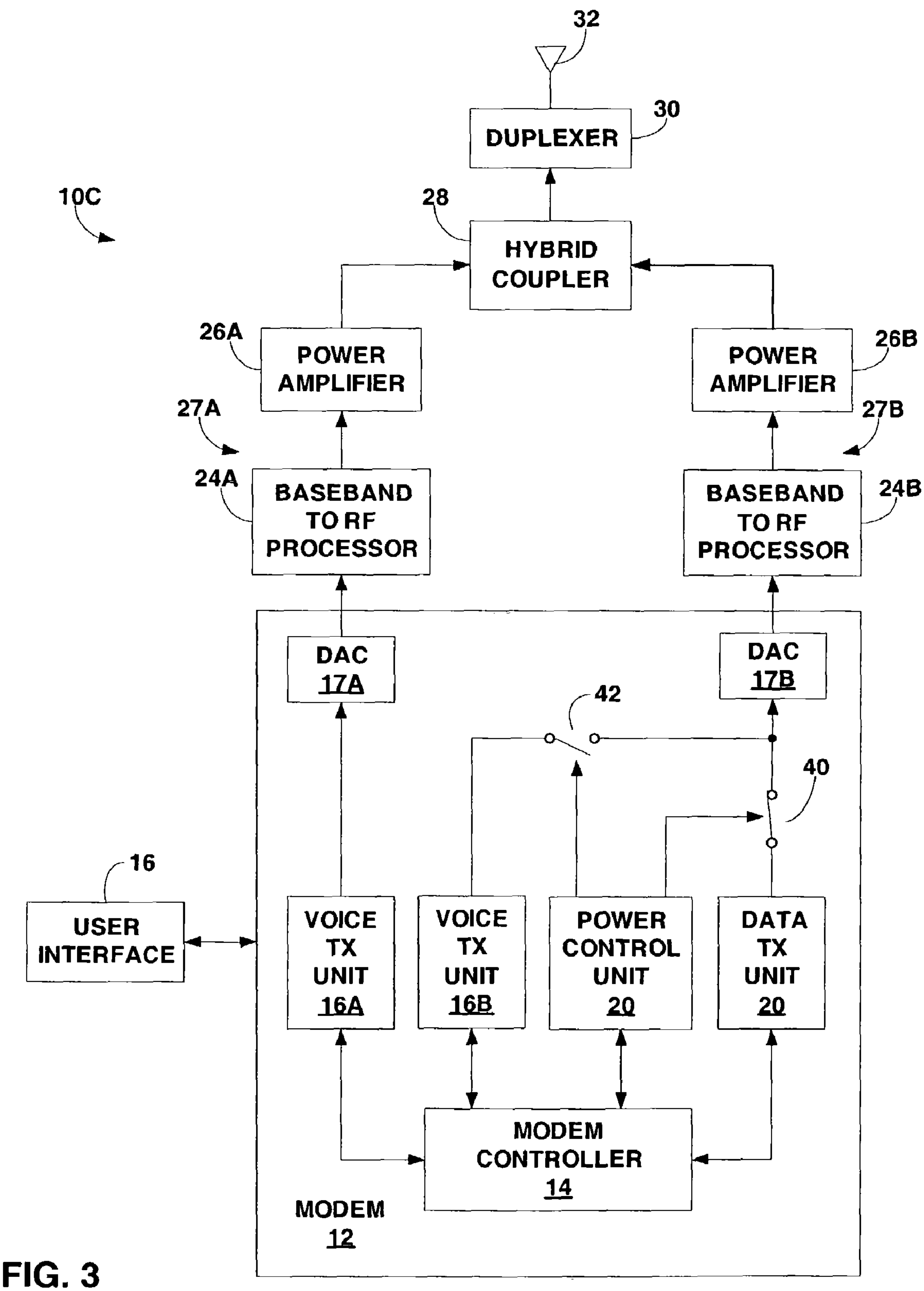
FIG. 3 is another block diagram illustrating an alternative wireless communication device capable of combining dual transmitter output branches for high power voice transmission.

FIG. 3 is another block diagram illustrating an alternative wireless communication device 10C capable of combining dual transmitter output branches for high power voice transmission. Device 10C conforms substantially to devices 10A and 10B of FIGS. 1 and 2, respectively, but represents another exemplary digital implementation. In the example of FIG. 3, power control unit 20, switch 40 and switch 42 may be implemented digitally within modem 12 to form a digital signal processing unit for selectively coupling a voice call and a phase-shifted voice call to the output branches. Instead of a phase shifter, however, modem 12 of device 10C includes two independent voice TX units 16A, 16B. Voice TX unit 16A produces a digital voice signal for transmission over a first output branch 27A. Voice TX unit 16B produces a digital voice signal for transmission over second output branch 27B. In this manner, voice TX unit 16B digitally generates a second voice call substantially identical to the first voice call. However, the digital voice signal generated by voice TX unit 16B is phase-shifted, e.g., 90 degrees, relative to the digital voice signal generated by voice TX unit 16A.

When the required transmit power exceeds a threshold, power control unit 20 opens switch 40 to decouple the output of data TX unit 20 from output branch 27B. Power control unit 20 then closes switch 42 to couple the phase-shifted voice signal produced by voice TX unit 16B to output branch 27B. In addition, power control unit 20 may be configured to disable or stall data TX unit 20 during transmission of the phase-shifted voice signal over output branch 27B. Power control unit 20 also may be configured to activate voice TX unit 16B to generate the phase-shifted voice signal.

Baseband-to-RF processor 24A processes the voice signal output from DAC 17A, while baseband-to-RF processor 24B processes the voice signal output from DAC 17B. As described with reference to FIG. 2, baseband-to-RF processor 24B may be configured to provide a selectable frequency response to enable processing of the data signal produced by data TX unit 20 or processing of the phase-shifted voice signal produced by voice TX unit 16B on a selective basis, e.g., under control of power control unit 20. Again, the phase-shifted voice signal occupies a carrier frequency range appropriate for voice communication, whereas the data signal occupies a carrier frequency range appropriate for data communication.

Device 10C eliminates the need for a phase shifter, but incorporates an additional voice TX unit 16B. As in the examples of FIGS. 1 and 2, device 10C of FIG. 3 transmits the analog voice signal produced by DAC 17A over output branch 27A for processing by baseband-to-RF processor 24A and amplification by power amplifier 26A. When power control unit 20 opens switch 40 and closes switch 42, DAC 17B outputs, the phase-shifted analog voice signal for processing by baseband-to-RF processor 24B. Power amplifier 26B then amplifies the phase-shifted RF voice signal, and transmits the signal to hybrid coupler 28. Hybrid coupler 28 additively combines the voice signal and the phase-shifted voice signal to achieve an increased transmit power for more reliable voice communication.

Figure 4:
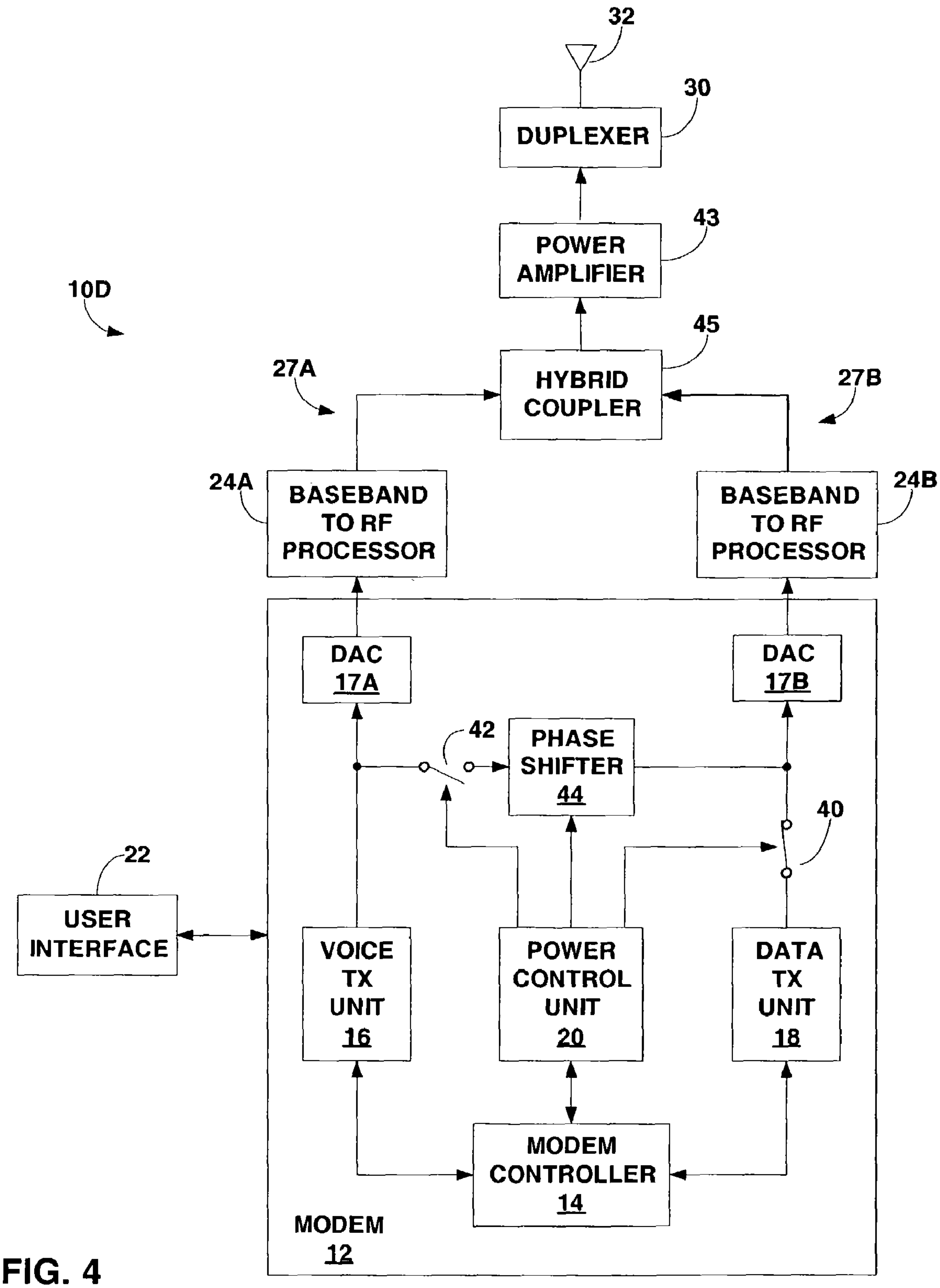
FIG. 4 is a block diagram illustrating another alternative wireless communication device capable of combining dual transmitter output branches for high power voice transmission.

FIG. 4 is a block diagram illustrating an alternative wireless communication device 10D capable of combining dual transmitter output branches for high power voice transmission. Device 10D conforms substantially to device 10C of FIG. 3. However, instead of a power amplifier for each output branch, device 10D includes a single power amplifier 43. Power amplifier 43 amplifies a combined signal provided by hybrid coupler 45. Hybrid coupler combines the respective outputs of baseband-to-RF processors 24A, 24B prior to amplification. In this manner, hybrid coupler 45 combines output branches 27A, 27B, but a single power amplifier 43 amplifies the combined signal. In the example of FIG. 4, hybrid coupler 45 operates at radio frequency. Hence, FIG. 4 may represent a zero intermediate frequency (ZIF) architecture. In other embodiments, however, hybrid coupler 45 may operate in an intermediate frequency band. Specifically, hybrid coupler 45 may combine signals from output branches 27A, 27B at intermediate, frequency for subsequent amplification at radio frequency by power amplifier 43.

Figure 5:
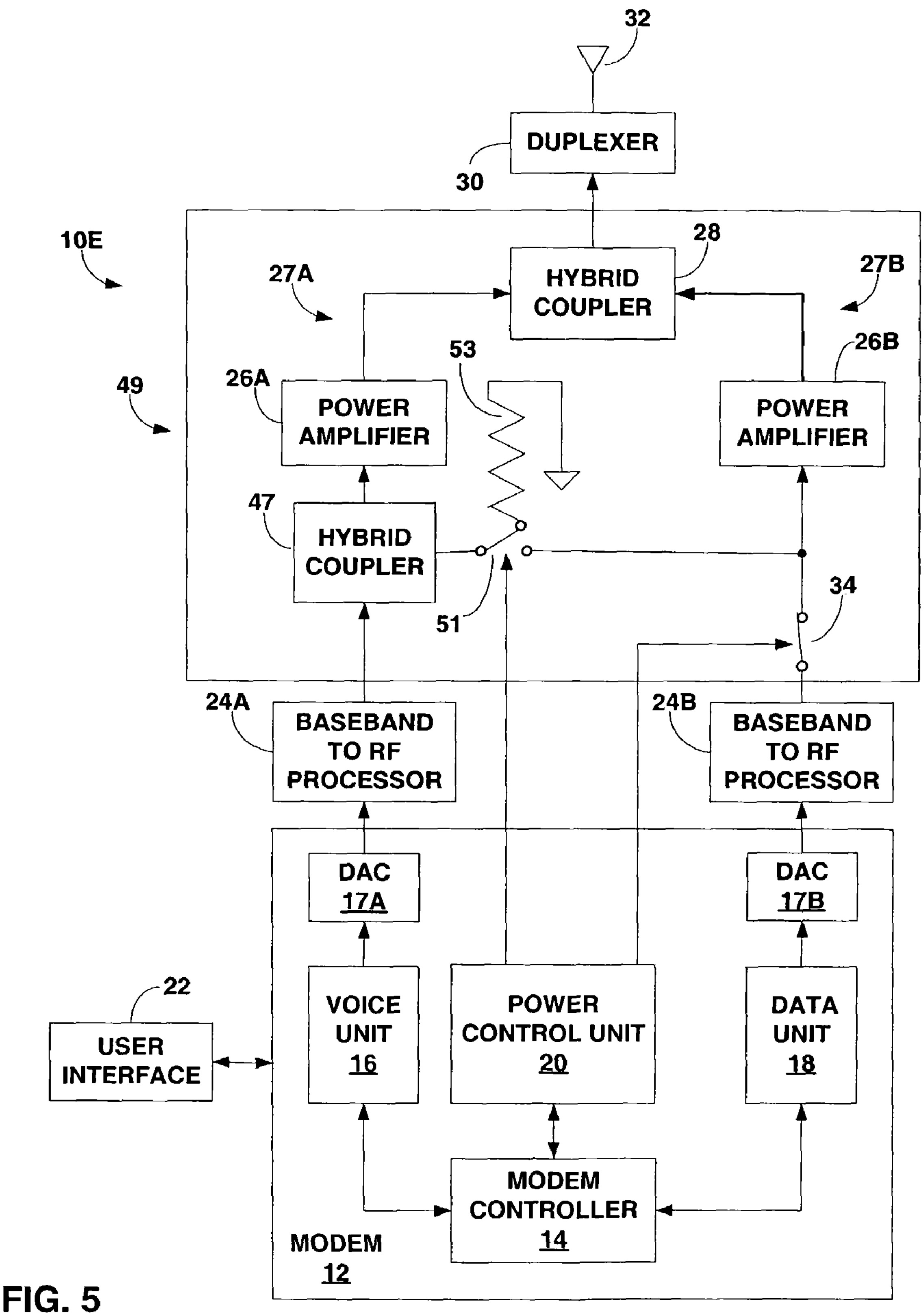
FIG. 5 is a block diagram illustrating another alternative wireless communication device capable of combining dual transmitter output branches for high power voice transmission.

FIG. 5 is a block diagram illustrating an alternative wireless communication device 10E capable of combining dual transmitter output branches for high power voice transmission. Device 10E conforms substantially to device 10B of FIG. 2. However, device 10E includes both an output hybrid coupler 28 and an input hybrid coupler 47. Hybrid couplers 28, 47 and power amplifiers 26A, 26B form a power amplifier module 49.

In the example of FIG. 5, input hybrid coupler 47 includes an input for voice calls received from baseband-to-RF processor 24A. Input hybrid coupler 47 also includes two outputs, one coupled to the input of power amplifier 26A, and another coupled to the input of power amplifier 26B via switch 51 or to a ground termination via resistor 53 (when switch 51 is coupled to resistor 53).

Under ordinary conditions, involving simultaneous voice and data transmission, baseband-to-RF processor 24A passes voice calls to power amplifier 26A via hybrid coupler 47, while baseband-to-RF processor 24B passes data calls to power amplifier 26B via switch 34. For simultaneous voice and data transmission, power control unit 20 opens switch 51 and closes switch 34. In this case, the second output of hybrid coupler 47 is terminated via to ground, resistor 53, and the data call is sent via output branch 27B to hybrid coupler 28, providing simultaneous voice and data transmission. Switches 34 and 51 together, form an example of a switch device to couple and decouple the phase-shifted voice call and the data call to and from power amplifier 26B.

When the required transmit power for a voice call exceeds an applicable threshold, power control unit 20 decouples the output of baseband-to-RF processor 24B from the input of power amplifier 2613, and closes switch 51 to couple the second output of hybrid coupler 47 to power amplifier 26B. In this case, hybrid coupler 47 produces a phase-shifted version of the voice call at the second output, and transmits the phase-shifted voice call to the input of power amplifier 26B. The voice call transmitted to power amplifier 26B may be phase-shifted by approximately 90 degrees relative to the voice call received by hybrid coupler 47. Hence, in the example of FIG. 5, hybrid coupler 47 plays the role of a phase shifter.

Output hybrid coupler 29 combines the voice call and the phase-shifted voice call to produce an overall voice call with significantly increased transmit power for transmission over duplexer and antenna 32. In particular, hybrid coupler 28 combines the amplified voice call and phase-shifted voice call to achieve an increased overall transmit power for more reliable voice communication. When the required transmit power is below the threshold, power control unit 20 opens switch 51 to terminate the second output of hybrid coupler 47, and closes switch 34 to couple the data call output from baseband-to-RF processor 24B to the input of power amplifier 26B, thereby restoring simultaneous voice and data communication.

Figure 6:
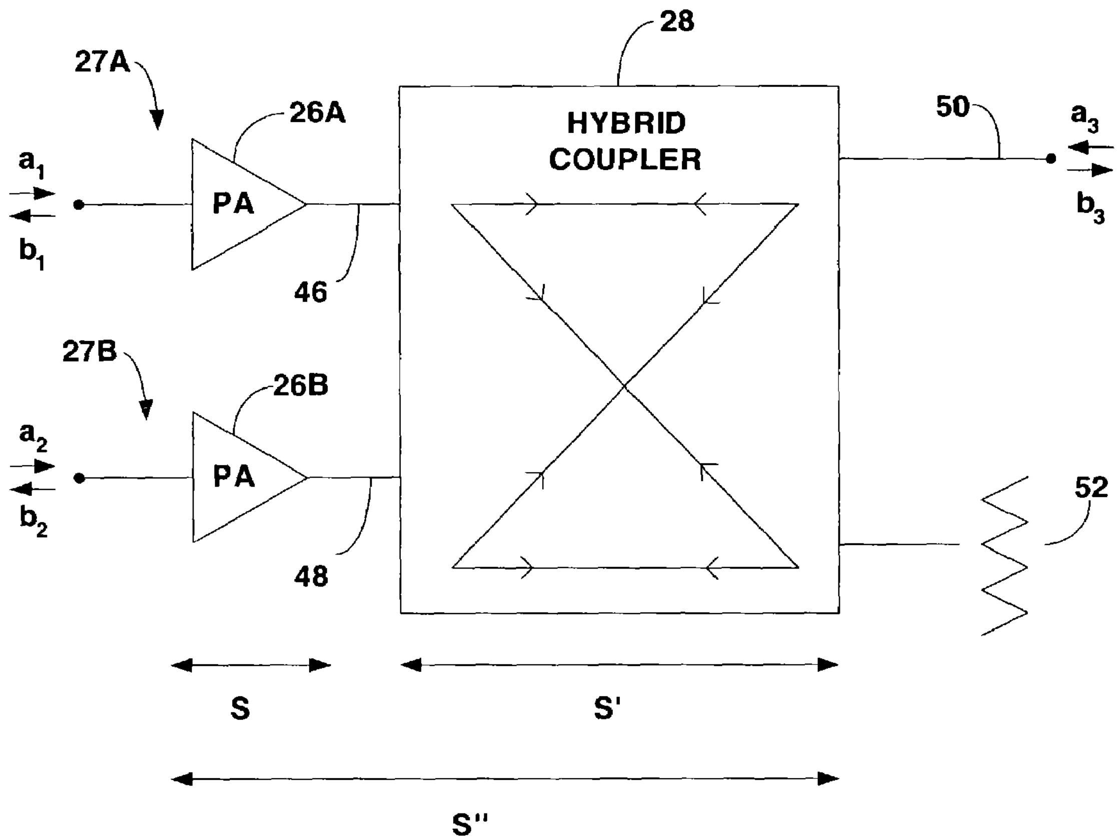
FIG. 6 is a circuit diagram illustrating an exemplary hybrid coupler circuit for use with any of the embodiments illustrated in FIGS. 1–5.

FIG. 6 is a circuit diagram illustrating an exemplary embodiment of hybrid coupler 28 for use with any of the embodiments of devices 10A, 10B, 10C, 10D, 10E illustrated in FIGS. 1–5. Hybrid coupler 28 may serve multiple purposes. For example, hybrid coupler 28 provides a good termination for duplexer 30, which would otherwise be exposed to uncertain and uncontrolled output impedance of power amplifiers 26A, 26B. A good termination also serves to maintain the frequency characteristics of duplexer 30, in terms of pass and stop bands. In addition, hybrid coupler 28 provides a good termination for power amplifiers 26A, 26B, which is advisable for power and linearity performance. Also, hybrid coupler 28 may, prevent, strong external signals from reaching power amplifiers 26A, 26B and causing intermodulation products. In general, hybrid coupler 28 supports an economical scheme for independent transmission of voice and data without the need for isolators.

As shown in FIG. 6, power amplifiers 26A, 26B drive the inputs 46, 48 of a 90-degree hybrid coupler 28. The incident "a" and reflected "b" waves from s-parameter theory are also shown in FIG. 6. In general, low-power voice signals are transmitted via the upper output branch 27A, data signals are transmitted via the lower output branch 27B, and the output branches are combined to transmit high power voice signals. If the two incident waves, $a_1$ and $a_2$, at the input ports 46, 48 are identical expect for a 90-degree phase shift, they will add, ideally without loss, to produce $a_3$ at the third port. The s-parameters for the two amplifiers 26A, 26B are as follows:

$$S=\left[\begin{array}{cc|cc} s_{11,1} & 0 & s_{12,1} & 0 \\ 0 & s_{11,2} & 0 & s_{12,2} \\ \hline s_{21,1} & 0 & s_{22,1} & 0 \\ 0 & s_{21,2} & 0 & s_{22,2} \end{array}\right]=\begin{bmatrix} S_{11} & S_{12} \\ S_{21} & S_{22} \end{bmatrix} \tag{1}$$

The s parameters for hybrid coupler 28 are as follows:

$$S'=\frac{1}{\sqrt{2}}\left[\begin{array}{cc|c} 0 & 0 & 1 \\ 0 & 0 & j \\ \hline 1 & j & 0 \end{array}\right]=\begin{bmatrix} S'_{11} & S'_{12} \\ S'_{21} & S'_{22} \end{bmatrix} \tag{2}$$

Generally, the joint s-parameters are as follows:

$$S''=\begin{bmatrix} S_{11}+S_{12}S'_{11}(I-S_{22}S'_{11})^{-1}S_{21} & S_{12}(I-S'_{11}S_{22})^{-1}S'_{12} \\ S'_{21}(I-S_{22}S'_{11})^{-1}S_{21} & S'_{22}+S'_{21}S_{22}(I-S'_{11}S_{22})^{-1}S'_{12} \end{bmatrix} \tag{3}$$

Upon substitution of equations (1) and (2), the joint s-parameters are represented as follows:

$$S''=\frac{1}{\sqrt{2}}\left[\begin{array}{cc|c} s_{11,1} & 0 & s_{12,1} \\ 0 & s_{11,2} & js_{12,2} \\ \hline s_{21,1} & js_{21,2} & s_{22,1}-s_{22,2} \end{array}\right] \tag{4}$$

To better understand the result, consider the case where, the two input waves $a_1$ and $a_2$ are the only inputs. Then, the outward traveling waves can be represented as:

$$\begin{bmatrix} b_1 \\ b_2 \\ b_3 \end{bmatrix}=S''\begin{bmatrix} a_1 \\ a_2 \\ 0 \end{bmatrix}=\frac{1}{\sqrt{2}}\begin{bmatrix} a_1 s_{11,1} \\ a_2 s_{11,2} \\ a_1 s_{21,2}+ja_2 s_{21,2} \end{bmatrix} \tag{5}$$

If the input ports of amplifiers 26A, 26B are matched ($s_{11,1}=S_{11,2}=0$), their gains are equal, then:

$$\begin{bmatrix} b_1 \\ b_2 \\ b_3 \end{bmatrix}=\frac{1}{\sqrt{2}}\begin{bmatrix} 0 \\ 0 \\ s_{21}(a_1+ja_2) \end{bmatrix} \tag{6}$$

In view of expression (6) above, it is apparent that the output 50 of coupler 28 is the sum of the inputs 46, 48, with a phase shift, and is scaled by the gain of the amplifiers 26A, 26B. In the special case in which $a_2=-ja_1$, the output of hybrid coupler 28 is $2s_{21}a_1/\sqrt{2}$, and the signals combine without substantial loss. If the inputs 46, 48 to hybrid coupler 28 are independent, e.g., at different carrier frequencies as in the case of simultaneous voice and data transmission, half the power is delivered to output 50 of the hybrid coupler and half the power is delivered to termination 52.

Given the characteristics described above, hybrid coupler 28 can be configured to support a dual transmission scheme as outlined in this disclosure. When increased transmit power is required for voice transmission, and the required transmit power exceeds a predetermined threshold, hybrid coupler 28 combines the two output branches 27A, 27B without substantial loss by correctly phasing the signal in each output branch. Thus, for high-power speech, the inputs 46, 48 to hybrid coupler 28 are identical apart from the 90-degree phase difference. Otherwise, with independent signals such as voice and data at different carrier frequencies, there is a 3 dB combining loss. The combining loss will tend to be less significant at low and medium transmit power. In that power range, the current ordinarily will be closer to the quiescent level and should not deviate significantly over a few decibels of power.

Hybrid coupler 28 also provides a good output termination if amplifiers 26A, 26B have identical reflection coefficient. In other words, hybrid coupler 28 should provide a good source termination for duplexer 30. This characteristic can be observed by imagining a signal directed toward the output of hybrid coupler 28, in which case:

$$\begin{bmatrix} b_1 \\ b_2 \\ b_3 \end{bmatrix} = S'' \begin{bmatrix} 0 \\ 0 \\ a_3 \end{bmatrix} = \frac{1}{\sqrt{2}} \begin{bmatrix} s_{12,1} \\ js_{12,2} \\ s_{22,1} + js_{22,2} \end{bmatrix} \tag{7}$$

If both amplifiers 26A, 26B operate unilaterally, then $S_{12,1}=S_{12,2}=0$. If amplifiers 26A, 26B also have identical output reflection coefficients, then $S_{22,1}=S_{22,2}$, and:

$$\begin{bmatrix} b_1 \\ b_2 \\ b_3 \end{bmatrix} = S'' \begin{bmatrix} 0 \\ 0 \\ a_3 \end{bmatrix} = a_3 \begin{bmatrix} 0 \\ 0 \\ 0 \end{bmatrix} \tag{8}$$

Notably, there is no reflected signal. Instead, the incident wave is directed to the termination 52 of hybrid coupler 28. In general, the output 50 of hybrid coupler 28 serves as a good termination, even if the outputs of amplifiers 26A, 26B are not. This property may permit elimination of an additional isolator between amplifiers 26A, 26B and duplexer 30.

When hybrid coupler 28 operates with carriers at different frequencies, i.e., voice and data signals are received at the inputs 46, 48 of the hybrid coupler, the isolation between the input ports has special significance. The appearance of two different frequencies at the output of power amplifiers 26A, 26B presents the potential for intermodulation products to be radiated at troublesome strengths and frequencies. Isolation is influenced not only by the construction of hybrid coupler 28, but also by the load termination, i.e., duplexer 30. If the input to duplexer 30 has a reflection coefficient $\rho_L$, then $a_3$ may be represented as $\rho_L b_3$ and substituted into equation (2) as follows:

$$\begin{bmatrix} b_1 \\ b_2 \end{bmatrix} = \frac{\rho_L}{2} \begin{bmatrix} 1 & j \\ 1 & j \end{bmatrix} \begin{bmatrix} a_1 \\ a_2 \end{bmatrix} \tag{9}$$

Hence, with a non-zero reflection coefficient of the load, both signals are reflected back toward each input 46, 48 of hybrid coupler 28, i.e., to the respective outputs of amplifiers 26A, 26B. Accordingly, the RIF performance of hybrid coupler 28 may be designed to specifically address this situation.

There is an advantage in the coupler-based architecture of device 10 with respect to receiver-band noise. In particular, the noise level of each amplifier 26A, 26B is less than an amplifier operating at twice the output power. Assuming, for purposes of illustration, that the output noise level of each amplifier 26A, 26B is −140 dBm/Hz, the signal outputs of each amplifier combine in-phase at the output port of hybrid coupler 28 for high power speech, when the receiver-band noise is most detrimental. The noise from each amplifier 26A, 26B, conversely, is independent and is therefore split between the output 50 of hybrid coupler 28 and the termination 52. In effect only the equivalent noise level of a single amplifier 26A, 26B is transmitted to output 50.

Figure 7:
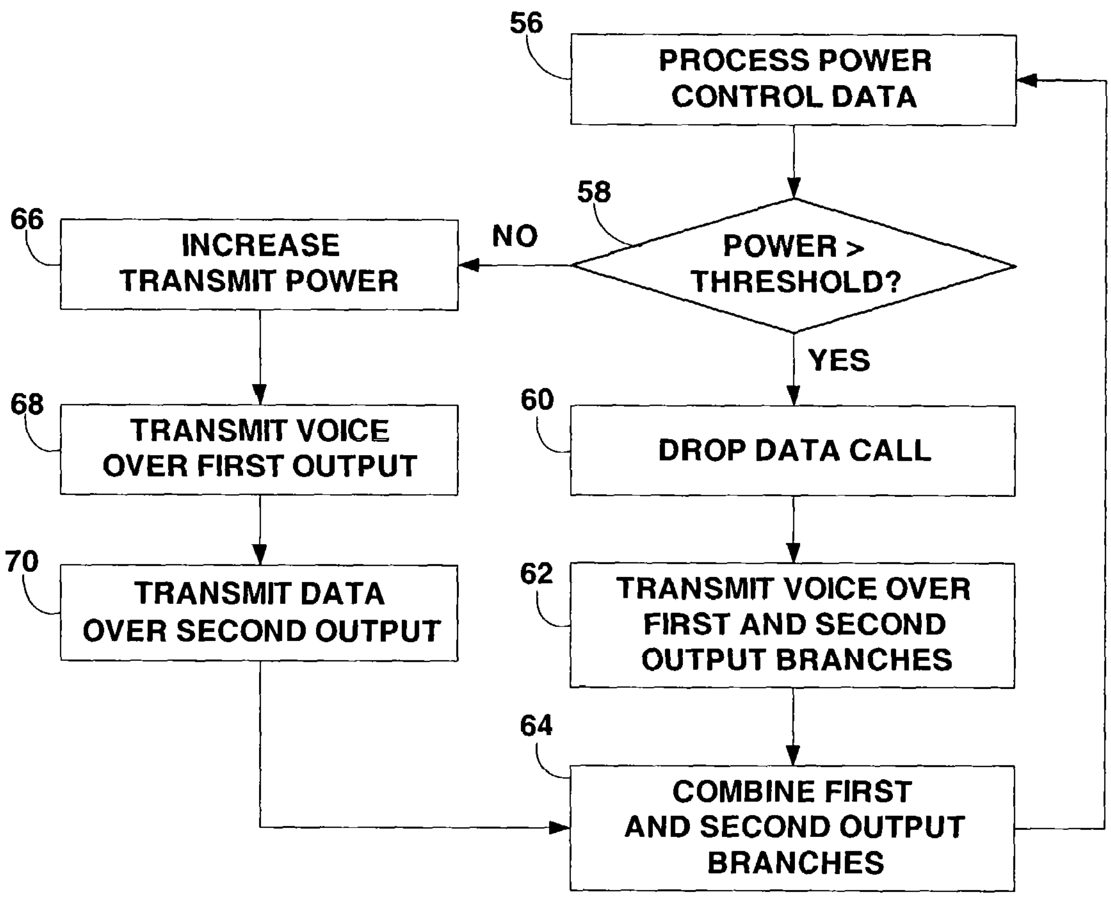
FIG. 7 is a flow diagram illustrating a method for combining dual transmitter output branches for high power voice transmission.

FIG. 7 is a flow diagram illustrating a method for combining dual transmitter output branches 27A, 27B (FIGS. 1–5) for high power voice transmission. The method depicted in FIG. 7 assumes the presence of two output branches 27A, 27B that ordinarily handle voice and data calls independently and simultaneously. As shown in FIG. 7, power control unit 20 processes power control data (56), such as power control bits received from a base station in the forward link, to determine whether transmit power for a voice call should be increased or decreased.

If the required transmit power for the voice call exceeds a threshold (58), power control unit 20 controls one or more switch arrangements, to drop the data call (60), and transmits the voice call over both the first and second output branches 27A, 27B (62). Hybrid coupler 28 then combines the first and second output branches 27A, 27B for high power transmission of the voice call (64).

If the required transmit power for the voice call does not exceed the applicable threshold (58), power control unit 20 simply increases the transmit power on output branch 27A as needed (66), e.g., by increasing the gain of power amplifier 26A. In this case, device 10 continues to simultaneously and independently transmit the voice call over output branch 27A (68) and the data call over output branch 27B (70). Hybrid coupler 28 then combines the first and second output branches 27A, 27B for transmission of both the voice call and the data call via a common air interface (64). When the required transmit power drops below the threshold, power control unit 20 may direct that a data call be resumed or restarted.

Figure 8:
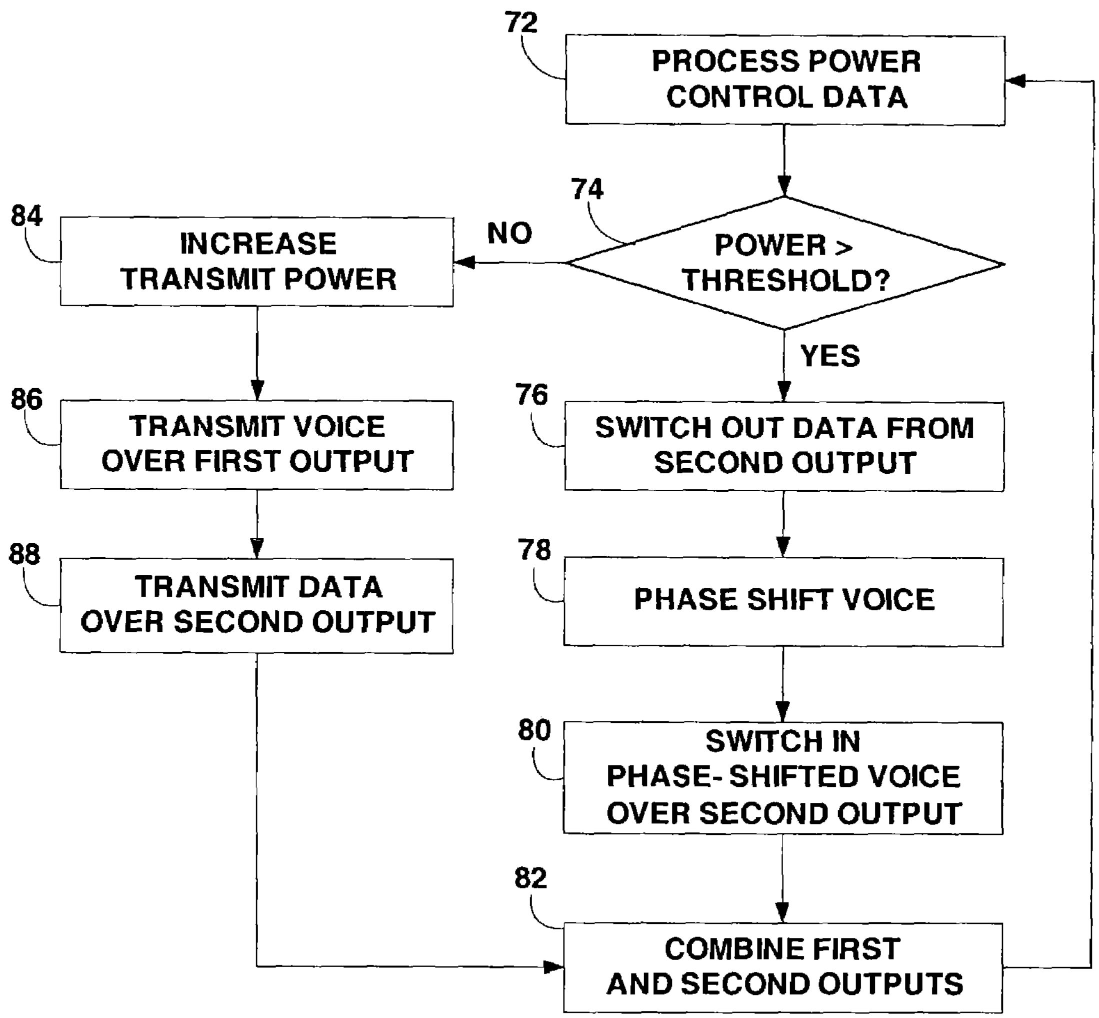
FIG. 8 is a flow diagram illustrating the method of FIG. 7 in greater detail.

FIG. 8 is a flow diagram illustrating the method of FIG. 7 in greater detail. As in the example of FIG. 7, power control unit 20 processes power control data (72), and determines whether the required transmit power exceeds a threshold (74). If so, power control unit 20 switches out the data call from second output branch 27B (76), produces a phase-shifted component of the voice call (78) and switches in the phase-shifted voice component over second output branch 27B (80). Hybrid coupler 28 then combines first and second output branches 27A, 27B for high power transmission of the voice call (82).

If the required transmit power for the voice call does not exceed the applicable threshold (74), power control unit 20 simply increases the transmit power on output branch 27A as needed (84), e.g., by increasing the gain of power amplifier 26A. In this case, device 10 continues to simultaneously and independently transmit the voice call over output branch 27A (86) and the data call over output branch 27B (88). Hybrid coupler 28 then combines the first and second output branches 27A, 27B for transmission of both the voice call and the data call via a common air interface (82). When the required transmit power drops below the threshold, power control unit 20 may direct that a data call be resumed or restarted.

Various embodiments have been described. Example hardware implementations for the functional components described herein may include implementations within a microprocessor, digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store or otherwise comprise computer-readable instructions, i.e., program code that can be executed by a processor or DSP of a wireless communication device to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like.

Numerous other modifications may be made without departing from the spirit and scope of this disclosure. Accordingly, these and other embodiments are within the scope of the following claims. These and other embodiments are within the scope of the following claims.

The invention claimed is:

1. A power amplifier module comprising:

a first amplifier to amplify a voice call for transmission over a first output branch;

a second amplifier to amplify a data call for transmission over a second output branch;

a phase shifter to generate a phase-shifted version of the voice call; and at least one switch to decouple the data call from the second amplifier and couple the phase-shifted version of the voice call to the second amplifier when required transmit power for the voice call exceeds a threshold.

2. The power amplifier module of claim 1, further comprising a coupler circuit to combine the first and second output branches for transmission over a wireless interface associated with a mobile wireless communication device.

3. The power amplifier module of claim 2, wherein the coupler circuit includes a 90-degree hybrid coupler that combines the first and second output branches.

4. The power amplifier module of claim 1, further comprising a power control unit to control the phase shifter and the switch based on required transmit power for the voice call.

5. The power amplifier module of claim 4, wherein the power control unit monitors power control data, and controls the phase shifter and the switch in response to the power control data.

6. The power amplifier module of claim 4, wherein the power control unit controls the switch to couple the darn call to the second amplifier and decouple the voice call from the second amplifier when the required transmit power is less than the threshold.

7. The power amplifier module of claim 1, wherein the voice call and the phase-shifted voice call are substantially identical except for the phase shift.

8. The power amplifier module of claim 1, wherein the phase shifter phase-shifts the voice call approximately 90 degrees.

9. A power amplifier module comprising:

a first amplifier to amplify a voice call for transmission over a first output branch;

a second amplifier to amplify a data call for transmission over a second output branch;

a coupler circuit to combine the first and second output branches for transmission over a wireless interface associated with a mobile wireless communication device; and means for coupling a phase-shifted version of the voice call to the second amplifier when required transmit power for the voice call exceeds a threshold.

10. The power amplifier module of claim 9, wherein to coupler circuit includes a 90-degree hybrid coupler that combines the first and second output branches.

11. The power amplifier module of claim 9, wherein the coupling means includes at least one switch to decouple the data call from the second amplifier and couple the phase-shifted version of the voice call to the second amplifier when required transmit power for to voice call exceeds the threshold.

12. The power amplifier module of claim 9, further comprising a phase shifter to generate the phase-shifted version of the voice call when required transmit power for to voice call exceeds the threshold.

13. The power amplifier module of claim 12, wherein the phase shifter phase-shifts the voice call approximately 90 degrees.

14. The power amplifier module of claim 9, further comprising a power control unit to control the coupling means based on the required transmit power for the voice call.

15. The power amplifier module of claim 14, wherein the power control unit monitors power control data, and controls the coupling means in response to the power control data.

16. The power amplifier module of claim 9, wherein the power control unit controls the coupling means o couple the data call to the second amplifier and decouple the voice call from the second amplifier when the required transmit power is less than the threshold.

17. The power amplifier module of claim 9, wherein the voice call and the phase-shifted voice call are substantially Identical except for the phase shift.

18. A power amplifier/antenna module comprising:

a first amplifier to amplify a voice call for transmission over a first output branch;

a second amplifier to amplify a data call for transmission over a second output branch;

a radio frequency antenna for a wireless interface associated with a mobile wireless communication device;

a coupler circuit to combine the firs: and second output branches for transmission over the antenna; and a switch that couples a phase-shifted version of the voice call to the second amplifier when required transmit power the voice call exceeds a threshold.

19. The power amplifier/antenna module of claim 18, further comprising:

a phase shifter to generate the phase-shifted version of the voice call when required transmit power for the voice call exceeds the threshold;

a switch to decouple the data call from the second amplifier when required transmit power for the voice call exceeds the threshold.

20. The power amplifier/antenna module of claim 19, wherein the coupler circuit includes a 90-degree hybrid coupler that combines the first and second output branches.

21. The power amplifier/antenna module of claim 19, wherein the voice call and the phase-shifted voice call are substantially identical except for the phase shift.

22. The power amplifier/antenna module of claim 19, wherein the phase shifter phase-shifts the voice call approximately 90 degrees.

23. A digital signal processing module comprising:

a voice call transmission unit to generate a voice call for transmission via a first output branch;

a data call transmission unit to generate a data call for transmission via a second output branch;

a phase shifter to generate a phase-shifted version of the voice call; and at least one a switch to decouple the data call from the second output branch and couple the phase-shifted version of the voice call to the second output branch when required transmit power for the voice call exceeds a threshold.

24. The digital signal processing module of claim 23, further comprising a power control unit to control the phase shifter and the switch based on required transmit power for the voice call.

25. The digital signal processing module of claim 24, wherein the power control unit monitors power control data, and controls the phase shifter and the switch in response to the power control data.

26. The digital signal processing module of claim 25, wherein the power control unit controls the switch to couple the data call to the second amplifier and decouple the voice call from the second amplifier when the required transmit power is less than the threshold.

27. The digital signal processing module of claim 23, wherein the voice call and the phase-shifted voice call are substantially identical except for the phase shift.

28. The digital signal processing module of claim 23, wherein the phase shifter phase-shifts the voice call approximately 90 degrees.

29. A method comprising:

transmitting a voice call via a first output branch;

transmitting a data call via a second output branch;

combining the first and second output branches for transmission over a wireless interface associated with a mobile wireless communication device;

decoupling the data call from the second output branch when required transmit power for the voice call exceeds a threshold; and transmitting the voice call via both the first and second output branches when required transmit power for the voice call exceeds the threshold.

30. The method of claim 29, further comprising phase-shifting the voice call to produce a phase-shifted voice call, wherein transmitting the voice call via both the first and second output branches includes transmitting the voice call via the first output branch and transmitting the phase-shifted voice call via the second output branch.

31. The method of claim 30, wherein the voice call and the phase-shifted voice call are substantially identical except for the phase shift.

32. The method of claim 30, wherein phase-shifting the voice call includes phase-shifting the voice call approximately 90 degrees.

33. The method of claim 32, further comprising combining the first and second output branches via a 90-degree hybrid coupler.

34. The method of claim 29, further comprising:

monitoring power control data; and increasing the transmit power of the voice call in response to the power control data.

35. The method of claim 29, wherein transmitting the voice call via both the first and second output branches includes coupling the voice call to the second output branch.

36. The method of claim 29, wherein transmitting the voice call via both the first and second output branches includes digitally generating a second voice call substantially identical to the first voice call and coupling the second voice call to the second output branch.

37. The method of claim 29, further comprising coupling the data call to the second output branch and decoupling the voice call from the second output branch when the required transmit power is less than the threshold.

38. The method of claim 29, further comprising:

amplifying the voice call transmitted via the first output branch with a first power amplifier; and amplifying the voice call transmitted via the second output branch with a second power amplifier, wherein combining the first and second output branches includes combining the first and second amplified voice calls.

39. The method of claim 38, further comprising:

transmitting the voice call at a first carrier frequency; and transmitting the data call at a second carrier frequency.

40. A mobile wireless communication device comprising:

a first output branch for transmission of a voice call;

a second output branch for transmission of a data call;

a coupler circuit to combine the first and second output branches for transmission over a wireless interface associated with a mobile wireless communication device; and a power control unit to direct decoupling of the call from the second output branch and transmission of the voice call via both the first and second output branches when required transmit power for the voice call exceeds a threshold.

41. The device of claim 40, further comprising a phase shifter to phase-shift the voice call to produce a phase-shifted voice call, wherein the transmit controller transmits the voice call via the first output branch and transmits the phase-shifted voice call via the second output branch.

42. The device of claim 41, wherein the voice call and the phase-shifted voice call are substantially identical except for the phase shift.

43. The device of claim 41, wherein the phase shifter phase-shifts the voice call approximately 90 degrees.

44. The device of claim 41, wherein the coupler circuit includes a 90-degree hybrid coupler that combines the first and second output branches.

45. The device of claim 40, wherein the power control unit monitors power control data, and increases the transmit power of the voice call in response to the power control data.

46. The device of claim 40, wherein the power control unit directs transmission of the voice call via both the first and second output branches by coupling the voice call to the second output branch.

47. The device of claim 40, wherein the power control unit directs transmission of the voice call via both the first and second output branches by directing digital generation of a second voice call substantially identical to the first voice call and coupling the second voice call to the second output branch.

48. The device of claim 40, wherein the power control unit directs coupling of the data call to the second output branch and decoupling of the voice call from the second output branch when the required transmit power is less than the threshold.

49. The device of claim 40, further comprising:

a first power amplifier to amplifier the voice call transmitted via the first output branch; and a second power amplifier to amplify the voice call transmitted via the second output, wherein the coupler circuit combines the first and second amplified voice calls.

50. The device of claim 49, further comprising:

a first baseband to radio frequency processor to convert the voice call from a baseband frequency to a first carrier frequency; and a second baseband to radio frequency processor to convert the data call from a baseband frequency to a second carrier frequency.

51. The device of claim 50, further comprising a phase shifter to phase-shift the voice call to produce a phase-shifted voice call, wherein the transmit controller transmits the voice call via the first output branch and transmits the phase-shifted voice call via the second output branch, and wherein the phase shifter is coupled to the output branch of the first baseband to radio frequency processor.

52. A method comprising:

transmitting a voice call at a first transmit carrier frequency via a first output branch;

transmitting a data call at a second transmit carrier frequency via a second output branch;

controlling a transmit power of the voice call in response to power control data; and dropping the data call and transmitting the voice call via both the first and second output branches at the first transmit carrier frequency when the transmit power of the voice call exceeds a threshold.

53. The method of claim 52, further comprising phase-shifting the voice call to produce a phase-shifted voice call, wherein transmitting the voice call via both the first and second output branches includes transmitting the voice call via the first output branch and transmitting the phase-shifted voice call via the second output branch.

54. The method of claim 53, wherein phase-shifting the voice call includes phase-shifting the voice call approximately 90 degrees.

55. A mobile wireless communication device comprising:

a first output branch for transmission of a voice call at a first transmit carrier frequency;

a second output branch for transmission of a data call at a second transmit frequency; and a power control unit to control a transmit power of the voice call in response to power control data, wherein the power control unit drops the data call and directs transmission of the voice call via both the first and second output branches at the first transmit carrier frequency when the transmit power of the voice call exceeds a threshold.

56. The device of claim 55, further comprising a phase shifter to phase-shift the voice call to produce a phase-shifted voice call, wherein the transmit controller transmits the voice call via the first output branch and transmits the phase-shifted voice call via the second output branch.

57. The device of claim 56, wherein the phase shifter phase-shifts the voice call approximately 90 degrees.

58. A wireless communication device comprising:

means for transmitting a voice call via a first output branch;

means for transmitting a data call via a second output branch;

means for combining the first and second output branches for transmission over a wireless interface associated with a mobile wireless communication device;

means for decoupling the data call from the second output branch when required transmit power for the voice call exceeds a threshold; and means for transmitting the voice call via both the first and second output branches when required transmit power for the voice call exceeds the threshold.

59. The device of claim 58, further comprising means for phase-shifting the voice call to produce a phase-shifted voice call, wherein the moans for transmitting the voice call via both the first and second output branches includes means for transmitting the voice call via the first output branch and transmitting the phase-shifted voice call via the second output branch.

60. The device of claim 59, wherein the voice call and the phase-shifted voice call are substantially identical except for the phase shift.

61. The device of claim 59, wherein the phase-shifting means phase-shifts the voice call approximately 90 degrees.

62. The device of claim 61, further a 90-degree hybrid coupler for combining the first and second output branches.

63. The device of claim 58, wherein the voice call has a first carrier frequency, and the data call has a second carrier frequency different from the first carrier frequency.

64. A power amplifier module comprising:

a first amplifier to amplify a voice call for transmission over a first output branch;

a second amplifier to amplify a data call for transmission over a second output branch;

a first hybrid coupler to pass the voice call to the first amplifier and generate a phase-shifted version of the voice call;

at least one switch device to couple the phase-shifted version of the voice call to the second amplifier, and decouple the data call from the second amplifier when required transmit power for the voice call exceeds a threshold; and a second hybrid coupler to combine the first and second output branches for transmission over a wireless interface associated with a mobile wireless communication device.

65. The power amplifier module of claim 64, wherein the first hybrid coupler includes a 90-degree hybrid coupler, and the second hybrid coupler includes a 90-degree hybrid coupler.

66. The power amplifier module of claim 64, further comprising a power control unit to control the switch device based on required transmit power for the voice call.

67. The power amplifier module of claim 66, wherein die power control unit monitors power control data, and controls the switch device in response to the power control data.

68. The power amplifier module of claim 66, wherein the power control unit controls the which device to couple the data call to the second amplifier when the required transmit power is less than the threshold.

* * * * *